(12) United States Patent
Brodi, Jr. et al.

(10) Patent No.: US 6,247,722 B1
(45) Date of Patent: Jun. 19, 2001

(54) AIR BAG COVER WITH HIDDEN TEAR SEAMS

(75) Inventors: James Joseph Brodi, Jr., Sterling Heights; Carl Henry Visconti, Clarkston, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/540,700

(22) Filed: Mar. 31, 2000

(51) Int. Cl.$^7$ .................................................. B60R 21/16
(52) U.S. Cl. .......................................... 280/728.3; 280/731
(58) Field of Search ............................. 280/728.1, 728.3, 280/731, 732

(56) References Cited

U.S. PATENT DOCUMENTS

| | | | |
|---|---|---|---|
| 4,148,503 | * | 4/1979 | Shiratori et al. ................... 280/731 |
| 4,903,986 | * | 2/1990 | Cok et al. ........................ 280/728.2 |
| 5,060,971 | | 10/1991 | Nambu et al. . |
| 5,248,532 | * | 9/1993 | Sawada et al. .................... 428/35.2 |
| 5,292,150 | * | 3/1994 | Watanabe et al. ................. 280/728.3 |
| 5,320,380 | * | 6/1994 | Hamada et al. ................... 280/728.3 |
| 5,335,935 | * | 8/1994 | Proos et al. ....................... 280/728.3 |
| 5,730,460 | * | 3/1998 | Niederman ........................ 280/731 |
| 5,913,534 | | 6/1999 | Klingauf . |
| 6,050,594 | * | 4/2000 | Budnick ............................ 280/728.3 |

* cited by examiner

Primary Examiner—Paul N. Dickson
(74) Attorney, Agent, or Firm—Kathryn A. Marra

(57) ABSTRACT

A frangible cover for a vehicle air bag assembly is provided. The cover includes at least one tear seam across the inner surface of the cover which tear seam is substantially invisible at the exterior surface. The tear seam is made up of a multiplicity of spaced apart depressions of substantially uniform depth extending from the inner surface of the cover towards the outer surface of the cover thereby reducing the thickness of the cover to a substantially uniform level at the locations of the depressions. The depressions are spaced at substantially regular intervals along the length of the tear seam substantially without preferential concentration of the depressions at any one location along the tear seam. The depressions may be of variable width along the length of the tear seam as measured in the direction substantially transverse to the tear seam.

21 Claims, 5 Drawing Sheets

US 6,247,722 B1

AIR BAG COVER WITH HIDDEN TEAR SEAMS

TECHNICAL FIELD

The present invention relates to a cover for a vehicle air bag, and more particularly to a cover having one or more hidden tear seams which separate upon application of force by an inflating air bag thereby permitting the air bag to exit through the cover at the location of the separated tear seams.

BACKGROUND OF THE INVENTION

It is well known in motor vehicles to provide an air bag module for protecting a vehicle occupant. It is also generally known to provide an air bag module including an inflatable restraint cushion and an inflator for discharging gas to inflate the cushion upon sensing predetermined vehicle conditions. It is also known to provide air bag modules including cover elements overlying an inflatable restraint cushion and inflator in a stored position within the module wherein the cover elements include tear seams which open upon application of pressure by the inflatable restraint cushion during inflation such that the inflatable restraint cushion exits the module through the torn cover element.

Tear seams within prior cover elements have taken the form of: (i) scored grooves on the inner or outer surface of the cover; (ii) rows of spaced grooves on the inner surface of the cover with the grooves being closer together near the center of the cover and further apart at locations removed from the center of the cover; (iii) a continuous groove on the inner surface of the cover with the groove being deeper in portions near the center of the cover and shallower at locations removed from the center; and (iv) interconnected grooves consisting of spaced deeper grooves of substantially uniform size and shape with shallower grooves in the spaces between the deeper grooves with the deeper grooves being closer together near the center of the cover and spaced further apart at locations removed from the center.

As will be appreciated, the presence of scored grooves on the exterior of the cover may be aesthetically displeasing. When the tear seams are formed on the inner surface of the cover so as to reduce their visibility, the prior art has advocated the preferential concentration of grooves either in terms of numbers or height at the center of the cover with such concentration diminishing at locations removed from the center. Such preferential concentration of groove elements at the center of the cover may give rise to a substantial thinning of the overall cover thickness at the center which may make the cover subject to damage by externally applied forces thereby requiring premature replacement of the cover. Moreover, the high concentration of groove elements at the center of the cover may give rise to a shadowing affect which may cause the lines of fracture to be made visible to the vehicle occupants.

SUMMARY OF THE INVENTION

This invention provides advantages and alternatives over the prior art by providing a frangible cover for a vehicle air bag assembly which cover includes at least one tear seam across the inner surface of the cover which tear seam is substantially invisible at the exterior surface. The tear seam is comprised of a multiplicity of spaced apart depressions of substantially uniform depth extending from the inner surface of the cover towards the outer surface of the cover thereby reducing the thickness of the cover to a substantially uniform level at the locations of the depressions. The depressions are preferably spaced at substantially regular intervals along the length of the tear seam substantially without preferential concentration of the depressions at any one location along the tear seam. That is, the average number of depressions per unit length along the length of the tear seam will be substantially the same at the center of the seam and at locations removed from the center of the seam. The width of the depressions in the direction substantially transverse to the tear seam may vary along the length of the tear seam. Depressions of greater width may be located at the center of the tear seam.

Due to the substantially regular intervals of the depressions and their substantially uniform depth, no one area of the tear seam is thinned preferentially in comparison to other areas. Thus, incidents of damage from external forces may be reduced. Moreover, the absence of highly concentrated thinned areas may reduce the visibility of the underlying tear seam and thereby improve the aesthetic character of the final part. Controlled tearing of the seam may be effected through adjustment of the width dimension of the depressions transverse to the seam line so as to promote the initiation of seam separation at predetermined locations without the need for weakening the overall seam. Wider depressions may be disposed at the center of the seam. The depressions may be either discrete or interconnected by a shallower groove running between the individual depressions.

Thus, according to one aspect of the present invention a frangible cover is provided for disposition within a vehicle in covering relation to an inflatable air bag when the air bag is in an uninflated stored position. The cover opens by surface fracture upon application of force by the air bag as the air bag is inflated thereby permitting egress of the air bag through the cover into the vehicle interior. The cover includes an invisible tear seam disposed across the interior surface of the cover without a concentrated thinning of the cover element at any given location across the tear seam due to the substantially regular arrangement of depressions of substantially uniform height along the tear seam.

According to a further potentially preferred aspect of the present invention, a frangible cover is provided for disposition within a vehicle in covering relation to an inflatable air bag when the air bag is in an uninflated stored position. The cover opens by surface fracture upon application of force by the air bag as the air bag is inflated thereby permitting egress of the air bag through the cover into the vehicle interior. The cover includes an invisible tear seam disposed across the interior surface of the cover without a concentrated thinning of the cover element at any given location across the tear seam due to the substantially regular arrangement of depressions of substantially uniform height along the tear seam. The width of the depressions in the direction substantially transverse to the tear seam may be varied along the length of the tear seam. The width of the depressions at the center of the tear seam may be greater than the width of the depressions at the ends of the tear seam. The cover may be constructed of one or more than one layer. In the event that the cover has more than one layer, different materials may be used to form the different layers.

BRIEF DESCRIPTION OF THE DRAWINGS

The present invention will now be described, by way of example only, with reference to the accompanying drawings in which.

While the present invention is illustrated and will hereafter be described in relation to certain potentially preferred embodiments and practices, it is to be understood that the invention is in no way to be construed as limited to such embodiments or practices. To the contrary it is anticipated that modifications may be made and that other embodiments of the principals of the invention may occur to those of skill in the art to which the invention pertains. Therefore, it is the intent to cover all such modifications and embodiments as may incorporate the features of this invention broadly within the spirit and scope of the invention as defined by the claims appended hereto.

DESCRIPTION OF THE PREFERRED EMBODIMENT

Figure 1:
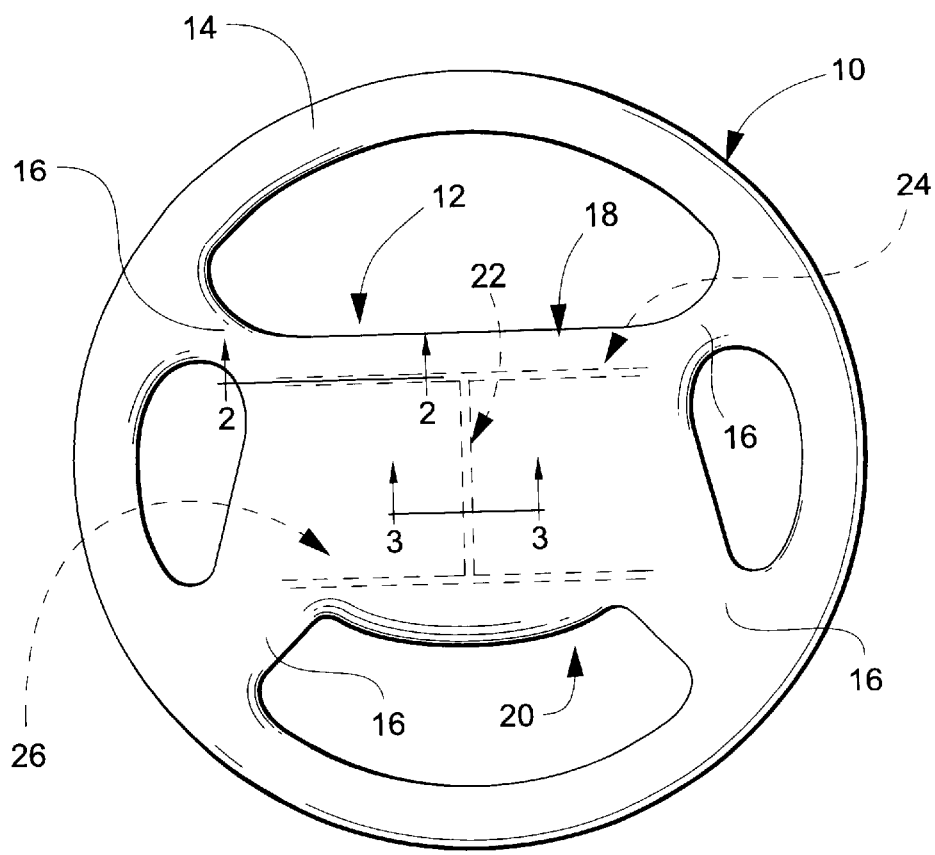
FIG. 1 is a plane view of a steering wheel and an air bag cover according to the present invention.

Referring to FIG. 1, a typical vehicle steering wheel 10 includes a central hub portion 12, a generally circular outer rim portion 14, and a plurality of spokes 16 which extend between the hub portion 12 and the rim portion 14. An air bag module 18 is mounted on the hub portion 12 of the steering wheel 10. The air bag module 18 includes an air bag (not shown) and an inflator (not shown) for discharging gas to inflate the air bag. An air bag cover 20 typically overlies the air bag and inflator thereby serving as a barrier between the operative elements of the air bag module 18 and the interior of the vehicle. As will be appreciated, while the illustrated configuration may be typical, it is likewise contemplated that the steering wheel 10 and air bag module 18 may take on any number of different configurations in which an air bag cover according to the present invention may find application.

According to the illustrated embodiment, the air bag cover 20 includes a central tear seam 22 and lateral tear seams 24, 26 which intersect the central tear seam 22 at substantially right angles as illustrated. In accordance with the present invention, the tear seams 22, 24, 26 are preferably formed within the cover 20 by a plurality of spaced apart depressions extending from the inner surface of the cover 20 towards the outer surface thereof as will be described further hereinafter.

While the air bag cover 20 is illustrated in reference to an air bag module 18 within a steering wheel 10 as would be typical for protection of the operator of a vehicle, it is to be appreciated that the air bag cover 20 in accordance with the present invention may be utilized in relation to air bag modules in any number of other locations within the vehicle. By way of example only, and not limitation, such air bag modules may be located in the instrument panel of a vehicle in generally opposing relation to a vehicle passenger as well as in the seats, door frames, and roof line of the vehicle. Furthermore, while the generally H-shaped geometric arrangement of the tear seams 22, 24, 26 may represent one potentially preferred embodiment, it is to be understood that any number of other geometric arrangements for tear seams may likewise be utilized. Regardless of the configuration of tear seams which is utilized, such tear seams will preferably separate upon application of force by the air bag as it is inflated thereby providing a path of egress for the air bag through the air bag cover 20 into the vehicle interior.

Figure 2:
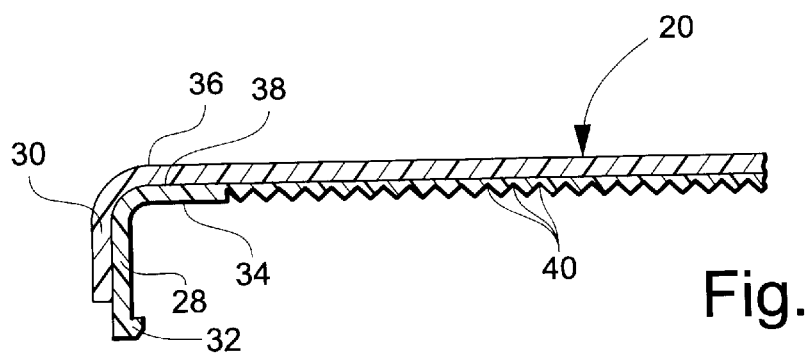
FIG. 2 is a cross-sectional view of one potential embodiment of an air bag cover according to the present invention taken along line 2—2 in FIG. 1 wherein the illustrated embodiment is of a two layered construction.

Referring now to FIG. 2, the cover 20 according to the illustrated embodiment may be of a two layered construction including an inner cover substrate forming an inner layer 28. In the event that such a two layered construction is utilized, the inner layer is preferably formed of a relatively rigid thermoplastic material suitable for formation by injection molding practices. As illustrated, the air bag cover 20 may also include a decorative outer layer 30 made of a plastic material such as a soft urethane foam or a thermoplastic rubber which adheres to the material forming the inner layer 28. As will be appreciated, the outer layer 30 serves a primarily decorative function and may be eliminated if desired.

According to one potential embodiment, the cover 20 may be substantially cup-shaped for housing the air bag and inflator therein. However, it is likewise contemplated that other geometric configurations including flat panel designs and the like may also be utilized. In the event that a cup-shaped configuration is utilized, the inner layer 28 may include downwardly extending hooks 32 spaced around its perimeter for attachment to a base element (not shown) of the air bag module 18.

In the embodiment illustrated in FIG. 2, the inner layer 28 of the air bag cover 20 defines an inner surface 34 while the outer layer 30 defines an outer surface 36 for the air bag cover 20. As will be appreciated, in the event that a separate outer layer 30 is not utilized, the outer surface of the air bag cover 20 will be defined by the exterior 38 of the inner layer 28. Regardless of the layered configuration of the air bag cover 20, a plurality of depressions 40 extend from the inner most surface which is in generally opposing relation to the air bag in the stored folded state towards the outermost surface of the air bag cover 20. The depressions 40 thereby serve to reduce the overall thickness of the cover 20 at the locations of their occurrence. In the event that the air bag cover 20 is of two or more layers, the depressions may extend either partially or completely across the inner layer 28 and may extend into the outer layer 30.

According to the potentially preferred practice of the present invention, the depressions 40 are spaced at substantially regular intervals in a seam path defining lines of fracture across the inner surface 34 of the air bag cover 20. As shown, the depressions 40 are preferably of a substantially uniform height along the tear seams such that the final thickness of the air bag cover 20 does not vary substantially along the length of the tear seams. That is, there is no preferential concentration of depressions within given segments of the individual tear seams 22, 24, 26. However, it is to be understood that the frequency of the depressions 40 may vary from tear seam to tear seam depending upon the fracture characteristics desired in the cover 20. By way of example only, in the event that the illustrated "H" shaped seam arrangement is utilized, it is contemplated that the frequency of the depressions 40 may be greater along the central tear seam 22 than along the lateral tear seams 24, 26 so as to promote the initiation of tearing at the central tear seam 22 upon the application of force to the cover 20 by the air bag as it inflates.

Figure 3:
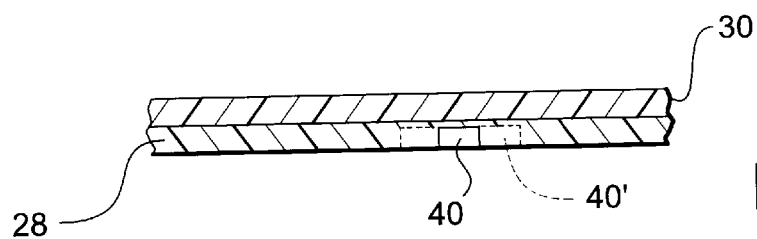
FIG. 3 is a cross-sectional view of one potential embodiment of an air bag cover according to the present invention taken along line 3—3 in FIG. 1 illustrating a depression of one possible geometry along a central tear seam within an air bag cover of two layered construction.

While the depressions 40 which extend along the tear seams across the inner surface 34 of the air bag cover 20 are preferably of a substantially uniform height and substantially regular spacing along a given tear seam, it is contemplated that the width dimension of the depressions as measured in the direction substantially transverse to a given tear seam may vary along the length of such tear seam. By way of illustration, as illustrated in FIG. 3 the width of a depression 40 closer to the end of the central tear seam 22 may be less than the width of a depression 40' shown in phantom lines closer to the center of the central tear seam 22. It is contemplated that the width dimension of the depressions 40 may vary from about 1 mm to about 4 mm.

It is believed that varying the width dimension of the depressions 40 rather than the height dimension or concentration of the depressions along any given tear seam that visual perception of the tear seams 22, 24, 26 by an occupant viewing the outer surface will be substantially diminished. In addition, since the depressions 40 are of substantially uniform height and are spaced at regular repeating intervals along each of the tear seams 22, 24, 26 it is contemplated that the process of imparting the depressions 40 to the inner surface 34 of the air bag cover 20 will not be subject to substantial irregularity and will therefore result in parts of greater uniformity.

Figure 4:
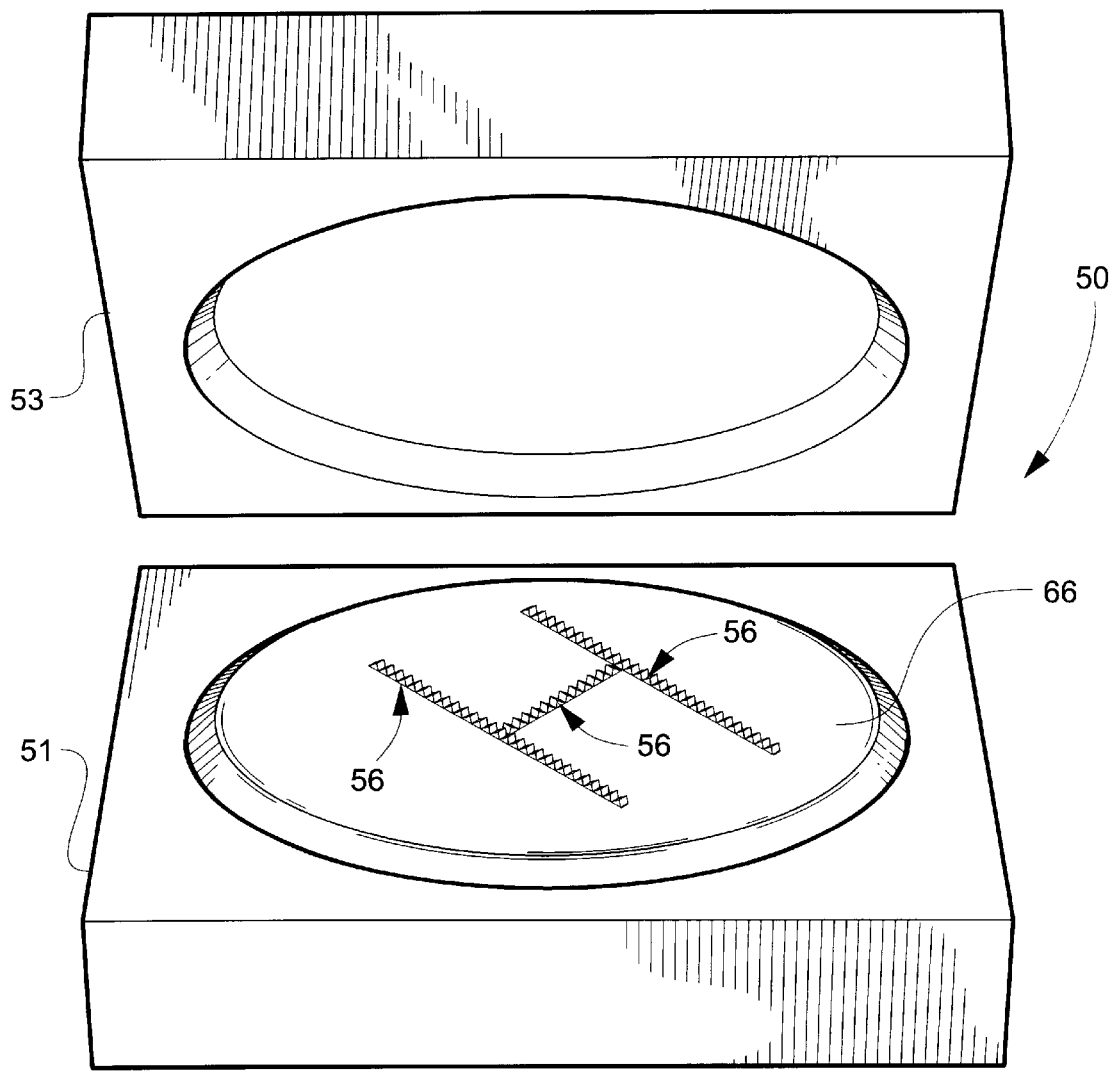
FIG. 4 illustrates two halves of an injection mold such as may be used to impart the seam pattern as illustrated in FIG. 1 to an air bag cover according to the present invention.
Figure 5:
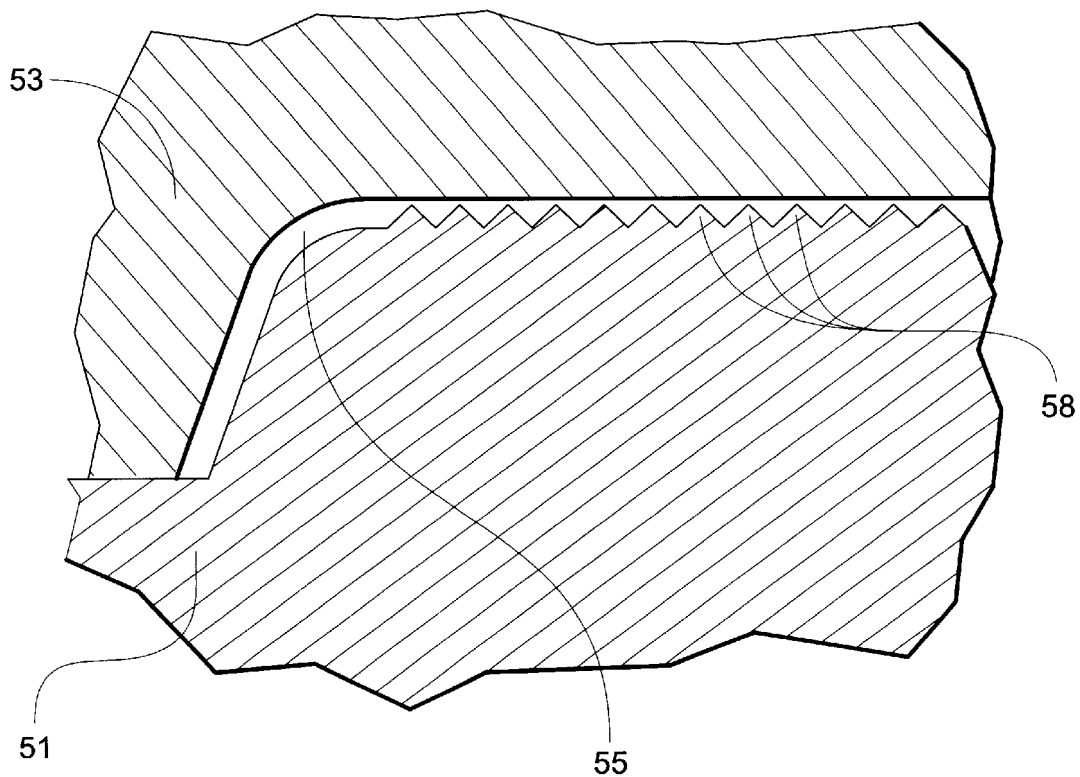
FIG. 5 is a cut-away view illustrating the mold halves of FIG. 4 in closed relation prior to injection of material forming the air bag cover according to the present invention.

As indicated, the air bag cover 20 is preferably formed by injection molding. In FIG. 4 there is illustrated a highly simplified mold 50 such as may be utilized to form the depressions 40 across the inner surface of the air bag cover 20 so as to define the tear seams 22, 24, 26 according to the geometric configuration as illustrated in FIG. 1. As illustrated, the mold 50 includes a core side 51 and a cavity side 53 which are mateable in substantially sealing relation so as to define a cavity 55 of relatively thin three dimensional configuration therebetween (FIG. 5). According to the illustrated and potentially preferred practice of the present invention, disposed across the interior of the core side 51 of the mold 50 is an arrangement of blade elements 56 of raised profile. According to the illustrated embodiment, these blade elements 56 of raised profile correspond generally to the central tear seam 22 and lateral tear seams 24, 26. The raised profile of the blade elements 56 corresponds to the profile of the depressions 40 extending from the inner layer 28 towards the outer layer 30 of the air bag cover 20.

As shown in FIG. 5, the cavity 55 between the core side 51 and the cavity side 53 of the mold 50 defines the surface configuration of the inner layer 28. That is, individual outwardly extending teeth 58 of the blade elements 56 serve to form the depressions 40 along the tear seams 22, 24, 26 when the material forming the inner layer 28 is injected into the mold cavity 55 and solidified. As shown, a slight gap may be left between the apex of the individual teeth 58 and the cavity side 53 of the mold 50 so that the teeth do not extend to the very surface of the inner layer 28. However, in the event that the depressions 40 are to extend to or beyond the interface between the inner layer 28 and the outer layer 30, such a gap will not be present and the cavity side 53 of the mold 50 may be configured to receive the upper portions of the individual teeth to the extent that they extend beyond the surface of the inner layer 28.

In the event that a decorative outer layer 30 is to be applied to the air bag cover 20, a second molding step will typically be utilized. During the second molding step the cavity side 53 of the mold 50 will typically be replaced by a different cavity side (not shown) which is placed in sealing relationship over the core side 51 and previously formed inner layer 28. Substitution of the cavity side 53 with the new cavity side results in the formation of a new cavity in overlying relation to the previously formed inner layer 28 which may be filled with material forming the outer layer 30. This so called "two shot" molding process results in a structure as illustrated in FIG. 2 wherein the decorative outer layer 30 overlies the inner layer 28 to form a laminate structure which may be handled as a unitary component in subsequent assembly processes.

Due to the substantially uniform height of the teeth 58 of the blade elements 56, the depth of penetration of the apex of the teeth 58 into the material forming the air bag cover 20 will be substantially uniform. The thickness of material remaining above the depressions 40 formed by the blade elements 56 will preferably be in the range of about 0.25 mm to about 1 mm. The substantially uniform height of the teeth 58 forming the depressions 40 will preferably be in the range of about 0.2 mm to about 2 mm.

According to the illustrated and potentially preferred practice of the present invention, the depressions 40 stop short of the exterior 38 of the inner layer 28 so as to avoid complete perforation of the inner layer 28. However, in instances where a decorative outer layer 30 is utilized, it is contemplated that the depressions may extend across the exterior of the inner layer 28 and partially into the decorative outer layer 30 terminating at some level below the outer surface 36 of the air bag cover 20.

It is contemplated that the configuration of the blade elements 56 may be selected so as to impart desired fracture characteristics along length of the individual tear seams 22, 24, 26 as may be desired. By way of example only, and not limitation, several potentially preferred configurations for the blade elements 56 as may be utilized in the formation of the air bag cover 20 according to the present invention are illustrated in FIGS. 6A, 6B, and 6C.

Figure 6A:
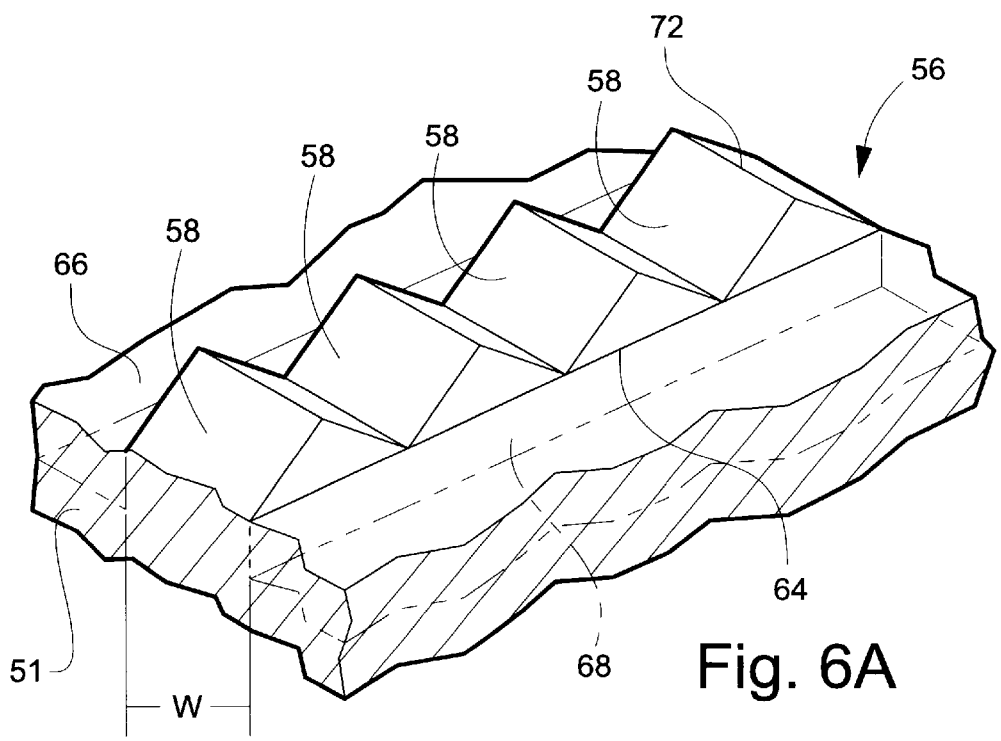
FIGS. 6A–6C illustrate several possible blade geometries for use in imparting tear seams across the interior surface of the air bag cover in accordance with the present invention.
Figure 6B:
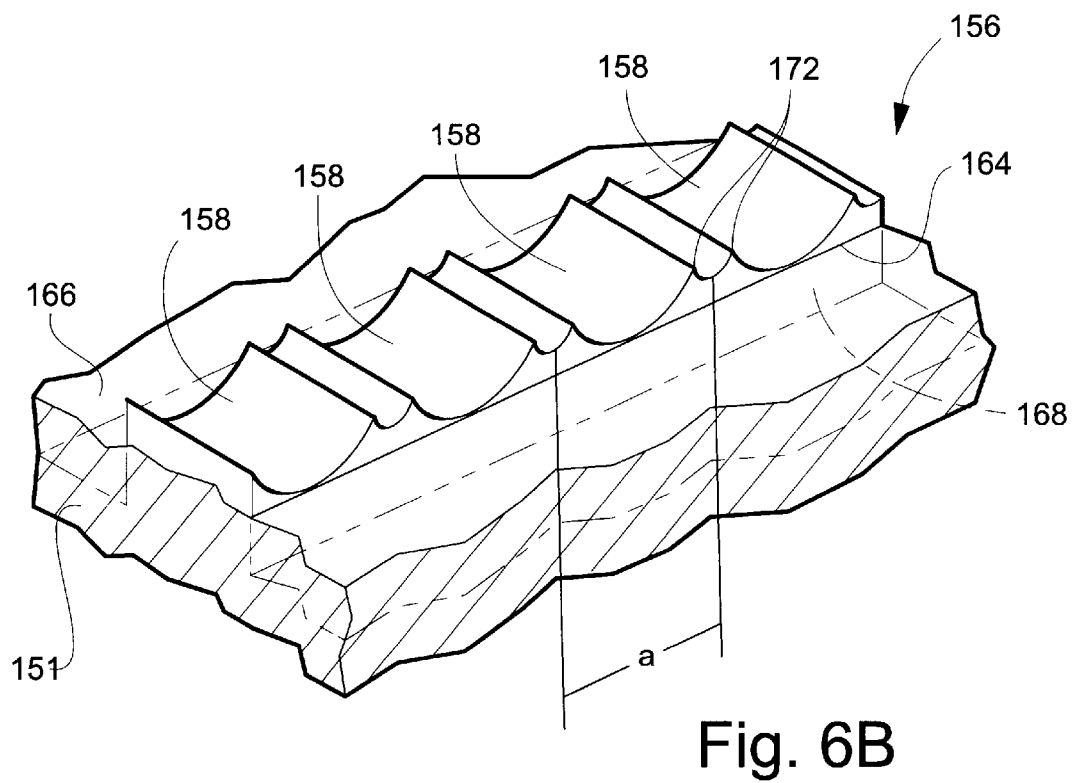
Figure 6C:
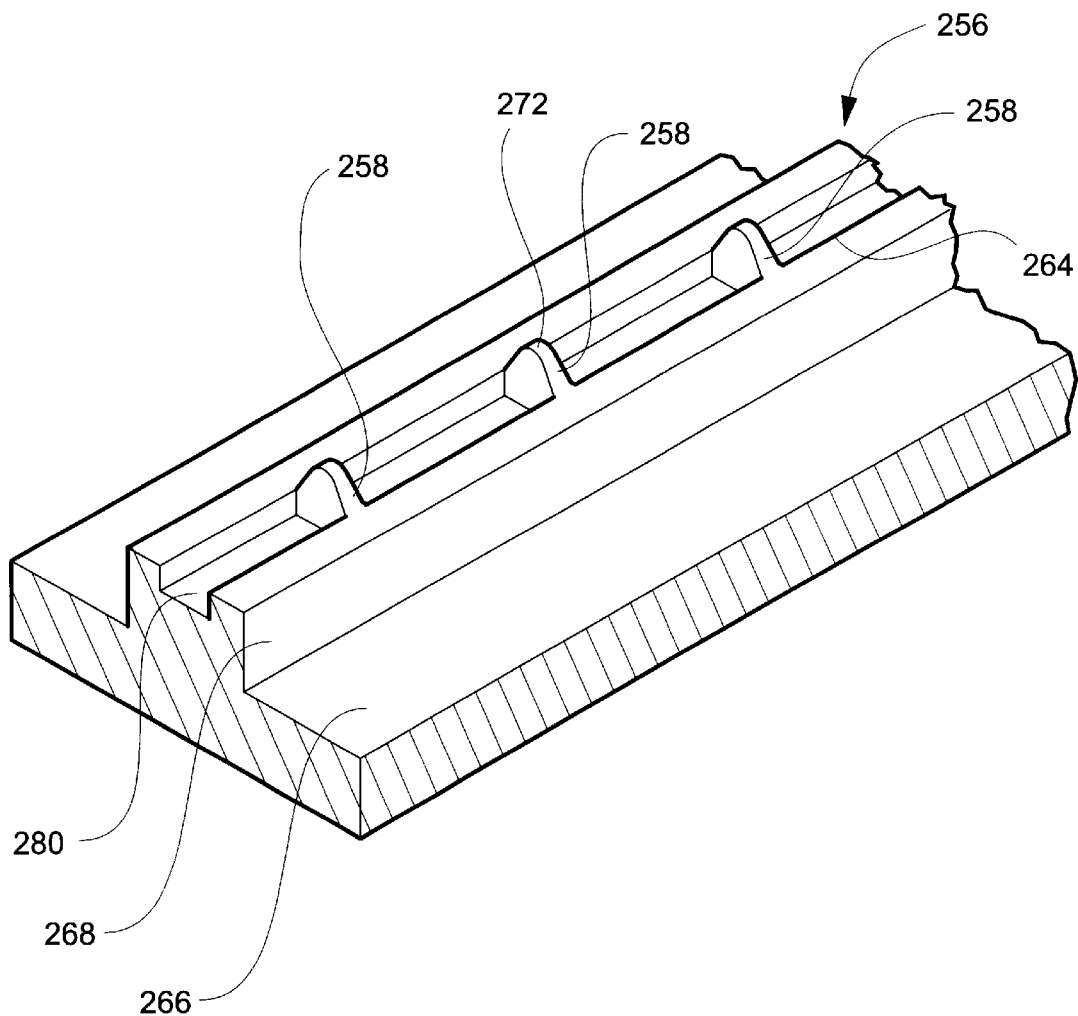

According to one potentially preferred embodiment as illustrated in FIG. 6A, the blade elements 56 comprise a plurality of individual discrete teeth 58 which rise from a base line 64 which may be substantially flush with the mold face 66 of the core side 51 of the mold 50 such that the teeth 58 extend in raised profile away from the mold face 66. In the event that further penetration of the teeth 58 into the air bag cover 20 is desired, it is contemplated that the individual teeth 58 may extend from a built-up base portion 68 as shown in phantom lines which extends above the mold face of the core side 51 of the mold 50. The utilization of a blade element 56 incorporating such a built-up base portion 68 will lead to the formation of a channel having a depth substantially equal to the height of the built-up base which runs along the tear seams between the individual depressions 40.

Without regard to whether or not a built-up base 68 is utilized, the individual teeth 58 will preferably penetrate the material forming the air bag cover 20 to a substantially uniform height along the length of the blade elements 56. That is, each of the teeth 58 is characterized by a height which is preferably substantially the same as the height of the other teeth 58 along the length of the blade element 56. Such a uniformity in height leads to a corresponding uniformity in penetration of the teeth 58 into the material forming the air bag cover 20 thereby resulting in depressions 40 which are of substantially uniform depth in the finished product. As indicated previously, the width "w" of the teeth 58 and hence the depressions 40 along the length of the tear seams 22, 24, 26 may be nonuniform so as to promote desired tearing characteristics in the air bag cover 20. The individual teeth 58 are preferably arranged at substantially regular repeating intervals along the length of the blade element 56 such that there is no substantial preferential concentration of depressions 40 within any particular region of the tear seams 22, 24, 26.

The preferred characteristics of substantially uniform height and spacing between the teeth 58 along the length of the blade elements 56 is illustrated in FIG. 6A wherein the teeth 58 are of a substantially saw-tooth configuration. In such an embodiment, the height of the individual teeth 58 as measured from the base line 64 of the teeth to the apex 72 of the teeth is preferably in the range of about 0.5 mm to about 2 mm. The distance from the center of each tooth to the center of the adjacent tooth is preferably in the range of about 2 mm to about 6 mm along the length of the blade elements 56.

In FIG. 6B there is illustrated an alternative configuration for the blade elements 56 forming the tear seams 22, 24, 26 wherein like elements as those illustrated in FIG. 6A are designated by like reference numerals increased by 100. As shown, the individual teeth 158 are of a double cusp configuration such that the depressions 40 will take on a double peaked stitch-like configuration along the length of the tear seams 22, 24, 26. As with the previous configurations, the individual teeth 158 are preferably arranged at regular repeating spacing along the length of the blade elements 56 such that the center to center distance "a" between adjacent teeth 158 is substantially uniform along the length of the blade elements 56. Such uniform spacing avoids the substantially preferential concentration of depressions 40 along the length of the tear seams 22, 24, 26. As with the prior embodiment, the height dimension of the teeth as measured from the base line 164 to the apex 172 of each of the peaks is preferably substantially uniform along the length of the blade elements 56 such that the depth of the depressions 40 formed by corresponding raised profile elements is substantially uniform along the length of the tear seams 22, 24, 26 formed by the blade elements.

Yet a third potentially preferred configuration for the blade elements for use in forming the tear seams across the inner surface 34 of the air bag cover 20 is illustrated in FIG. 6C wherein like elements illustrated in FIG. 6A are designated by like reference numerals increased by 200. As shown, the blade element 256 is preferably in raised relation to the mold face 266. The individual teeth 258 preferably extend outwardly from a slightly depressed trough 280 in raised peak-like fashion. The teeth 258 thus form discrete depressions extending inwardly from the inner surface of the air bag cover 20 along tear seams 22, 24, 26. As shown, the teeth 258 are preferably broader at their base and taper to a thinner profile at the apex 272. The thickness of the teeth 258 at the apex 272 will preferably be in the range of about 0.1 mm to about 0.5 mm while the thickness of the teeth 258 at the base line 264 will preferably be in the range of about 0.2 mm to about 1 mm. As will be appreciated, such tooth geometry leads to depressions 40 which are substantially trapezoidal in profile. As with the prior configurations, the height of the teeth 258 as measured from the base line 264 to the apex 272 will preferably be substantially uniform along the length of the blade elements. This height is preferably in the range of about 0.2 mm to about 1 mm. Likewise, the teeth 258 are preferably spaced at substantially regular intervals along the length of the blade elements 56 without preferential distribution in any individual region. Accordingly, the distance between adjacent teeth 258 will be substantially uniform along the entire length of the blade elements forming the tear seams 22, 24, 26.

While blade elements 56 of substantially similar configuration may be utilized to form each of the tear seams 22, 24, 26, it is likewise contemplated that blade elements 56 of differing configuration may be utilized in the formation of different tear seams. By way of example only, in the event that the substantially H-shaped seam orientation as illustrated in FIG. 1 is desired, the blade elements utilized in the formation of the lateral tear seams 24, 26 may be of similar configuration, while the blade elements utilized in the formation of the central tear seam may be of a different configuration.

As described above, the blade elements 56, 156, 256 utilized in the formation of the tear seams may be in fixed relation to the mold face. However, the present invention further contemplates that the blade elements 56, 156, 256 may likewise be extensible and retractable with respect to the mold face so as to be brought into and out of operative position during the molding operation. In the event that such extensible and retractable blade elements are utilized, it is contemplated that the cavity between the core side 51 and the cavity side 53 of the mold 50 will be filled with the material forming one or more layers of the air bag cover 20. Once the cavity has been filled to the extent required, the blade elements may be extended outwardly from the core side by appropriate pneumatic or hydraulic power elements thereby causing the previously introduced material to be pushed aside at the location of the protrusions along such blade elements so as to form the depressions 40 as may be desired. The blade elements may thereafter be retracted for repetition of the procedure.

It is contemplated that the use of such extensible and retractable blade elements may provide additional control over the formation of the depressions 40. Moreover, such extensible and retractable blade elements may be easily adjusted to accommodate different depth requirements for the depressions 40 in different air bag covers thereby permitting the same equipment to be used to form covers of differing character.

The present invention thus provides a frangible cover for an air bag assembly within a vehicle which includes tear seams 22, 24, 26 formed by blade elements which blade elements comprise teeth which extend in substantially uniform depth into the inner surface 34 of the air bag cover at substantially regular intervals along the tear seams thereby defining lines of fracture across the inner surface of the air bag cover 20 upon application of force by an air bag during inflation. The width of the teeth 58, 158, 258 in the dimension substantially transverse to the tear seams 22, 24, 26 may be varied along the length of the tear seams so as to promote desired fracture characteristics within the tear seams. The character of the individual tear seams may be similar or dissimilar from one another.

While specific embodiments of the present invention have been illustrated and described, it is to be understood that the invention is in no way limited thereto, since modifications may be made and other embodiments of the principles of this invention may occur to those of skill in the art to which this invention pertains. Therefore, it is intended by the appended claims to cover all such modifications and other embodiments as may incorporate the features of this invention within the true spirit and scope of such claims.

What is claimed is:

1. A frangible cover for disposition within a vehicle in covering relation to an inflatable air bag when the air bag is in an uninflated stored position, which cover opens by surface fracture upon application of force by the air bag as the air bag is inflated thereby permitting egress of the air bag through the cover into the vehicle interior, the cover comprising: an outer surface facing the vehicle interior and an inner surface facing away from the outer surface towards the air bag, the inner surface including a substantially centrally disposed tear seam extending across an interior portion of the inner surface, wherein the tear seam comprises a plurality of spaced depressions of substantially uniform depth extending from the inner surface of the cover towards the outer surface of the cover, thereby reducing the total thickness of the cover at the location of the depressions, the depressions being spaced at substantially regular intervals along the length of the tear seam such that the concentration and depth of the depressions is substantially uniform along the length of the tear seam.

2. The invention according to claim 1, wherein the width of the depressions as measured in the direction substantially transverse to the tear seam varies along the length of the tear seam.

3. The invention according to claim 2, wherein the width of the depressions is in the range of about 1 mm to about 4 mm.

4. The invention according to claim 2, wherein the width of the depressions at the center of the tear seam is greater than the width of the depressions at the ends of the tear seam.

5. The invention according to claim 1, wherein the cover is a two layered structure comprising an inner layer of molded plastic material and a decorative outer layer covering the inner layer.

6. The invention according to claim 5, wherein the spaced depressions extend from the inner surface of the cover partially through the inner layer but do not extend into contact with the decorative outer layer.

7. The invention according to claim 5, wherein the spaced depressions extend substantially through the inner layer to the decorative outer layer.

8. The invention according to claim 7, wherein the material forming the inner layer is more rigid than the material forming the decorative outer layer.

9. The invention according to claim 1, wherein the cover is formed from a single layer of molded plastic material.

10. The invention according to claim 1, wherein the depressions are of a substantially saw-tooth configuration.

11. The invention according to claim 1, wherein the depressions are of substantially cusp-like configuration.

12. A frangible cover for disposition within a vehicle in covering relation to an inflatable air bag when the air bag is in an uninflated stored position, which cover opens by surface fracture upon application of force by the air bag as the air bag is inflated thereby permitting egress of the air bag through the cover into the vehicle interior, the cover comprising: an outer surface facing the vehicle interior and an inner surface facing away from the outer surface towards the air bag, the inner surface including a plurality of tear seams arranged across the inner surface in a pattern comprising two lateral tear seams disposed adjacent the periphery of the cover and an interior tear seam extending between the lateral tear seams across the interior of the cover, wherein at least the interior tear seam comprises a plurality of spaced depressions of substantially uniform depth extending from the inner surface of the cover towards the outer surface of the cover, thereby reducing the total thickness of the cover at the location of the depressions, the depressions being spaced at substantially regular intervals along the length of the interior tear seam such that the concentration and depth of the depressions along the length of the interior tear seam is substantially uniform.

13. The invention according to claim 12, wherein the width of the depressions as measured in the direction substantially transverse to the interior tear seam varies along the length of the interior tear seam.

14. The invention according to claim 13, wherein the width of the depressions at the center of the interior tear seam is greater than the width of the depressions at the ends of the interior tear seam.

15. The invention according to claim 14, wherein the cover is formed from a single layer of injection molded thermoplastic material.

16. The invention according to claim 14, wherein the cover is a two layered structure comprising an inner layer of injection molded thermoplastic material and a decorative outer layer covering the inner layer and wherein the material forming the inner layer is more rigid than the material forming the outer layer.

17. The invention according to claim 16, wherein the spaced depressions extend from the inner surface of the cover partially through the inner layer but do not extend into contact with the decorative outer layer.

18. The invention according to claim 16, wherein the spaced depressions extend substantially through the inner layer to the decorative outer layer.

19. A frangible cover formed by an injection molding operation which cover is disposed within a vehicle in covering relation to an inflatable air bag when the air bag is in an uninflated stored position, and which cover opens by surface fracture upon application of force by the air bag as the air bag is inflated thereby permitting egress of the air bag through the cover into the vehicle interior, the cover comprising: an outer surface facing the vehicle interior and an inner surface facing away from the outer surface towards the air bag, the inner surface including a plurality of tear seams arranged across the inner surface, wherein each of the tear seams comprise a plurality of spaced depressions extending from the inner surface of the cover towards the outer surface of the cover, thereby reducing the total thickness of the cover at the location of the depressions, the depressions being of substantially uniform depth, the depressions being spaced at substantially regular intervals along the length of the tear seams such that the concentration of the depressions along the length of each of the tear seams is substantially uniform for that tear seam.

20. The invention according to claim 19, wherein the width of the depressions as measured in the direction substantially transverse to the tear seams varies along the length of one or more of the tear seams.

21. The invention according to claim 19, wherein at least a portion of the depressions are substantially trapezoidal in profile.

* * * * *